(12) United States Patent
Ishikawa

(10) Patent No.: US 7,267,352 B2
(45) Date of Patent: Sep. 11, 2007

(54) APPARATUS FOR MOUNTING AN ELECTRICAL COMPONENT TO A BICYCLE

(75) Inventor: Noriyasu Ishikawa, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 119 days.

(21) Appl. No.: 10/906,401

(22) Filed: Feb. 18, 2005

(65) Prior Publication Data

US 2006/0208453 A1    Sep. 21, 2006

(51) Int. Cl.
*B62J 39/00* (2006.01)
*H01M 2/10* (2006.01)

(52) U.S. Cl. .............. 280/288.4; 180/65.1; 224/902; 429/96

(58) Field of Classification Search ...... 180/65.1–65.3; 429/96, 98, 100
See application file for complete search history.

(56) References Cited

U.S. PATENT DOCUMENTS

| | | |
|---|---|---|
| 1,439,430 A | 12/1922 | Lyhne |
| 4,019,171 A | 4/1977 | Martelet |
| 4,204,191 A | 5/1980 | Daniels |
| 4,339,060 A | 7/1982 | Braida, Jr. |
| 5,276,593 A | 1/1994 | Lighthill et al. |
| 5,378,553 A * | 1/1995 | Shoji ........................ 429/97 |
| 5,470,277 A | 11/1995 | Romano |
| 5,480,356 A | 1/1996 | Campagnolo |
| 5,570,752 A | 11/1996 | Takata |
| 5,597,225 A | 1/1997 | Davis |
| 5,777,442 A | 7/1998 | Miyata |
| 5,789,898 A * | 8/1998 | Suzuki et al. .............. 320/104 |
| 5,865,454 A | 2/1999 | Campagnolo |
| 6,060,982 A | 5/2000 | Holtrop |
| 6,095,270 A * | 8/2000 | Ishikawa ................. 180/68.5 |
| 6,148,944 A | 11/2000 | Adomi et al. |
| 6,162,140 A | 12/2000 | Fukuda |
| 6,286,982 B1 | 9/2001 | Tashiro |
| 6,386,730 B1 * | 5/2002 | Matthews ................. 362/184 |
| 6,423,443 B1 | 7/2002 | Tsuboi et al. |
| 6,501,245 B2 | 12/2002 | Okuda |
| 6,558,180 B2 | 5/2003 | Nishimoto |
| 6,597,166 B2 | 7/2003 | Meggiolan |
| 6,600,411 B2 | 7/2003 | Nishimoto |
| 6,629,574 B2 | 10/2003 | Turner |
| 6,648,686 B2 | 11/2003 | Nishimoto |
| 6,669,220 B2 | 12/2003 | Meggiolan |
| 6,741,045 B2 | 5/2004 | Kitamura |
| 2001/0042767 A1 | 11/2001 | Campagnolo |
| 2003/0022743 A1 | 1/2003 | Meggiolan |

FOREIGN PATENT DOCUMENTS

| | | |
|---|---|---|
| JP | 62-67463 U | 4/1987 |
| JP | 2003-231487 A | 8/2003 |

* cited by examiner

*Primary Examiner*—Lesley D. Morris
*Assistant Examiner*—Marc A. Scharich
(74) *Attorney, Agent, or Firm*—James A. Deland

(57) ABSTRACT

An apparatus for mounting an electrical component to a bicycle comprises a mounting bracket, an electrical component case member and a stopper member. The electrical component case member is structured to be mounted in close proximity to the mounting bracket such that the electrical component case member is removed by moving the electrical component case member in a first direction. The electrical component case member has a surface facing in the first direction, and the stopper member is coupled to the mounting bracket and structured to engage the surface of the electrical component case member to inhibit movement of the electrical component case member in the first direction.

15 Claims, 13 Drawing Sheets

APPARATUS FOR MOUNTING AN ELECTRICAL COMPONENT TO A BICYCLE

BACKGROUND OF THE INVENTION

The present invention is directed to bicycles and, more particularly, to an apparatus for mounting an electric component to a bicycle.

Many electrical devices may be mounted to bicycles for various purposes. For example, simple cycle computers may be mounted to the bicycle to display riding and other parameters. More advanced cycle computers may be used to control the operation of various bicycle components. For example, a bicycle transmission or suspension system may be electrically controlled by manual or automatic operation. In manual adjustment of the transmission or suspension, the rider manipulates a switch in the form of a lever or button to set the bicycle transmission to a desired gear ratio or to set the suspension system to a desired stiffness. In automatic operation of the bicycle transmission, the wheel or crank speed is measured, and the bicycle transmission is set automatically to a desired gear ratio to maintain the wheel or crank speed within a desired range. In automatic operation of the suspension system, suspension stiffness is adjusted based on wheel speed, wherein suspension stiffness ordinarily is increased at higher wheel speeds.

As the number of functions performed by the cycle computer increases, the number of electronic components that must be attached to the bicycle correspondingly increases. For example, manual input devices such as control buttons and levers must be mounted to the handlebar or to some other location for convenient access by the rider. Sensors used for measuring different operating parameters must be mounted to the input devices and to the wheel, crank, transmission, suspension, etc. Motors, solenoids and other drive devices must be mounted to the transmission, suspension and other controlled devices to move the controlled devices to the proper operating position. The control electronics and power source also must be mounted at appropriate locations.

Of course, all of the various components must be connected together through appropriate wiring. Conventionally, all of the components were manufactured permanently wired together. The disadvantage of prewired components is the inability to accommodate the different functions desired by different markets. For example, the input devices, sensors and control devices prewired into the system predetermine the capability of the system. Additional capabilities could not be added at a later date, and a malfunction in one component frequently rendered the entire system useless. Prewired components also cannot efficiently accommodate the vast number of different bicycle frame configurations. In some cases either a component could not be placed in a desired location, or else there was so much excess wire that the wire had to be bundled and arbitrarily taped or tied to the bicycle frame, thus resulting in an unsightly appearance.

One way to provide more flexibility is to use detachable connectors so that individual components may be detachably connected together. This allows replacement of a malfunctioning component, adjustment of wire lengths to accommodate the configuration of the bicycle frame, and adding or deleting components as desired. Conventionally, each component had its own unique connector. Thus, there would be one or more male and female connector per component, and components would have to be manufactured with the matching connector in mind. As a result, the total number of connectors could be very large, components from different manufacturers often could not be used together, and even the components from a single manufacturer were limited by the chosen configuration.

SUMMARY OF THE INVENTION

The present invention is directed to various features of an apparatus for mounting an electrical component to a bicycle. In one embodiment, an apparatus for mounting an electrical component to a bicycle comprises a mounting bracket, an electrical component case member and a stopper member. The electrical component case member is structured to be mounted in close proximity to the mounting bracket such that the electrical component case member is removed by moving the electrical component case member in a first direction. The electrical component case member has a surface facing in the first direction, and the stopper member is coupled to the mounting bracket and structured to engage the surface of the electrical component case member to inhibit movement of the electrical component case member in the first direction. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
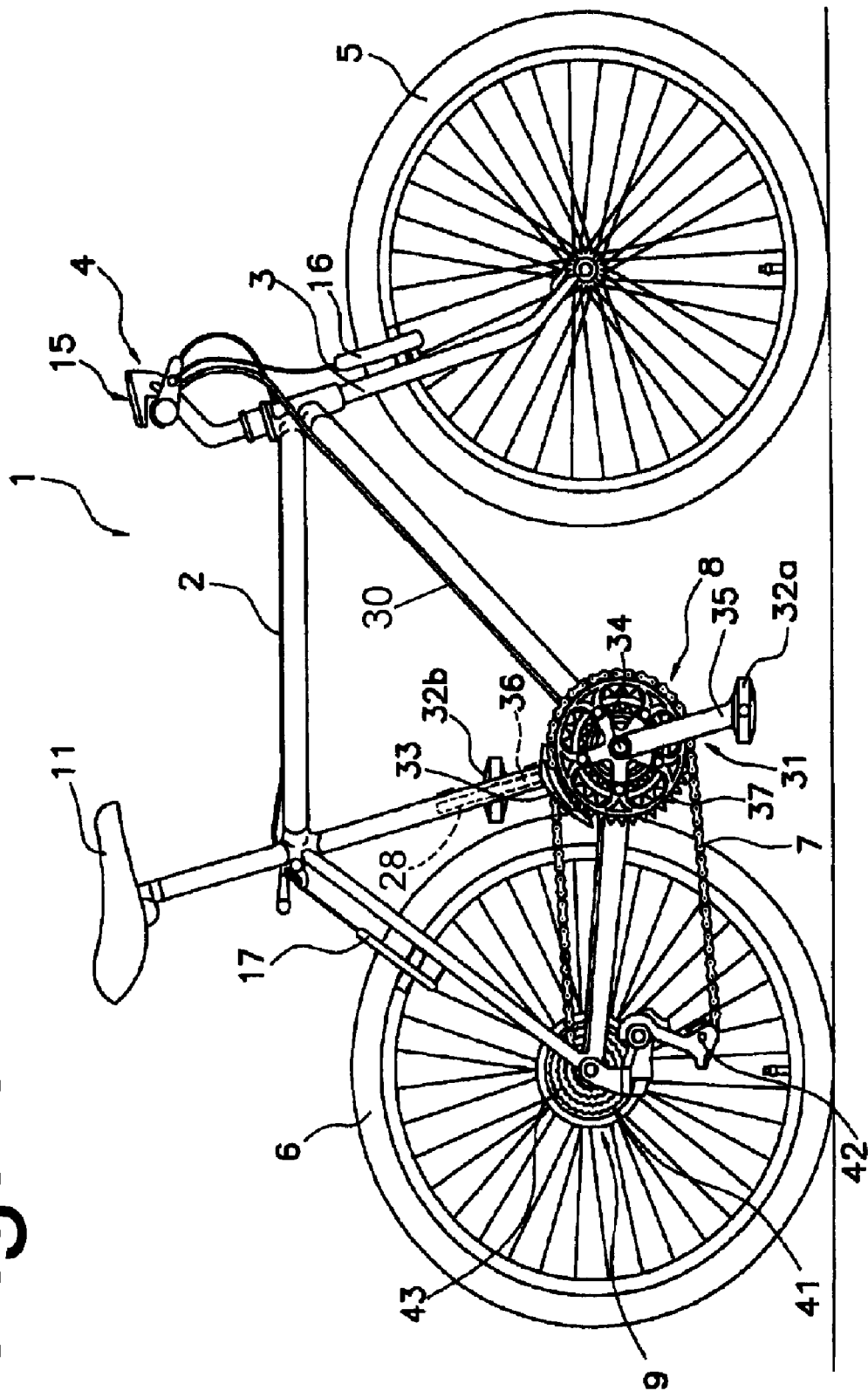
FIG. 1 is a side view of a bicycle that includes particular embodiments of electrically controlled components.

FIG. 1 is a side view of a bicycle that includes particular embodiments of electrically controlled components. Bicycle 1 is mountain bicycle comprising a frame 2, a front fork 3 rotatably mounted to frame 2, a handlebar assembly 4 mounted to the upper part of fork 3, a front wheel 5 rotatably attached to the lower part of fork 3, a rear wheel 6 rotatably attached to the rear of frame 2, a front transmission 8 attached to the lower middle portion of frame 2, a rear transmission 9 attached to the lower rear portion of frame 2, a chain 7 connected between front transmission 8 and rear transmission 9, and a saddle 11. A front wheel brake 16 is provided for braking front wheel 5, and a rear wheel brake 17 is provided for braking rear wheel 6.

Front transmission 8 transmits the drive force generated by the rider to the rear transmission 9 via chain 7. Front transmission 8 comprises, e.g., two sprockets 37 of various sizes and a front derailleur 33. The two sprockets 37 are installed on a gear crank 31 that is rotated when the rider pushes pedals 32a and 32b. Gear crank 31 comprises a crankshaft 34 that passes horizontally and rotatably through the central lower part of frame 2, a right crank 35, and a left crank 36. One end of the right crank 35 is connected to the right side of crankshaft 34, and the two sprockets 37 are attached to the right crank 35. One end of the left crank 36 is connected to the left side of crankshaft 34. The other ends of right crank 35 and left crank 36 rotatably support pedals 32a and 32b, respectively. Front derailleur 33 engages chain 7 with one of the two sprockets 37 and can be moved by a motor (not shown in the figures) that is controlled by a transmission control unit 15 mounted to handlebar assembly 4 and a combination unit 28 mounted to the lower middle portion of frame 2. Transmission control unit 15 and combination unit 28 are described in more detail below. A front derailleur position sensor (not shown in the figures) detects the position of front derailleur 33 and hence the current gear of front transmission 8.

Rear transmission 9 transmits the driving force received from chain 7 to rear wheel 6. Rear transmission 9 comprises a rear sprocket cluster 41 and a rear derailleur 42. In this embodiment, rear sprocket cluster 41 comprises seven sprockets 43 of different sizes that are mounted concentrically with the hub portion of rear wheel 6. Rear derailleur 42 engages chain 7 with one of the seven sprockets 43 and can be moved by a motor (not shown in the figures) that is controlled by transmission control unit 15 and combination unit 28. A rear derailleur position sensor (not shown in the figures) detects the position of rear derailleur 42 and hence the current gear of rear transmission 9.

Figure 2:
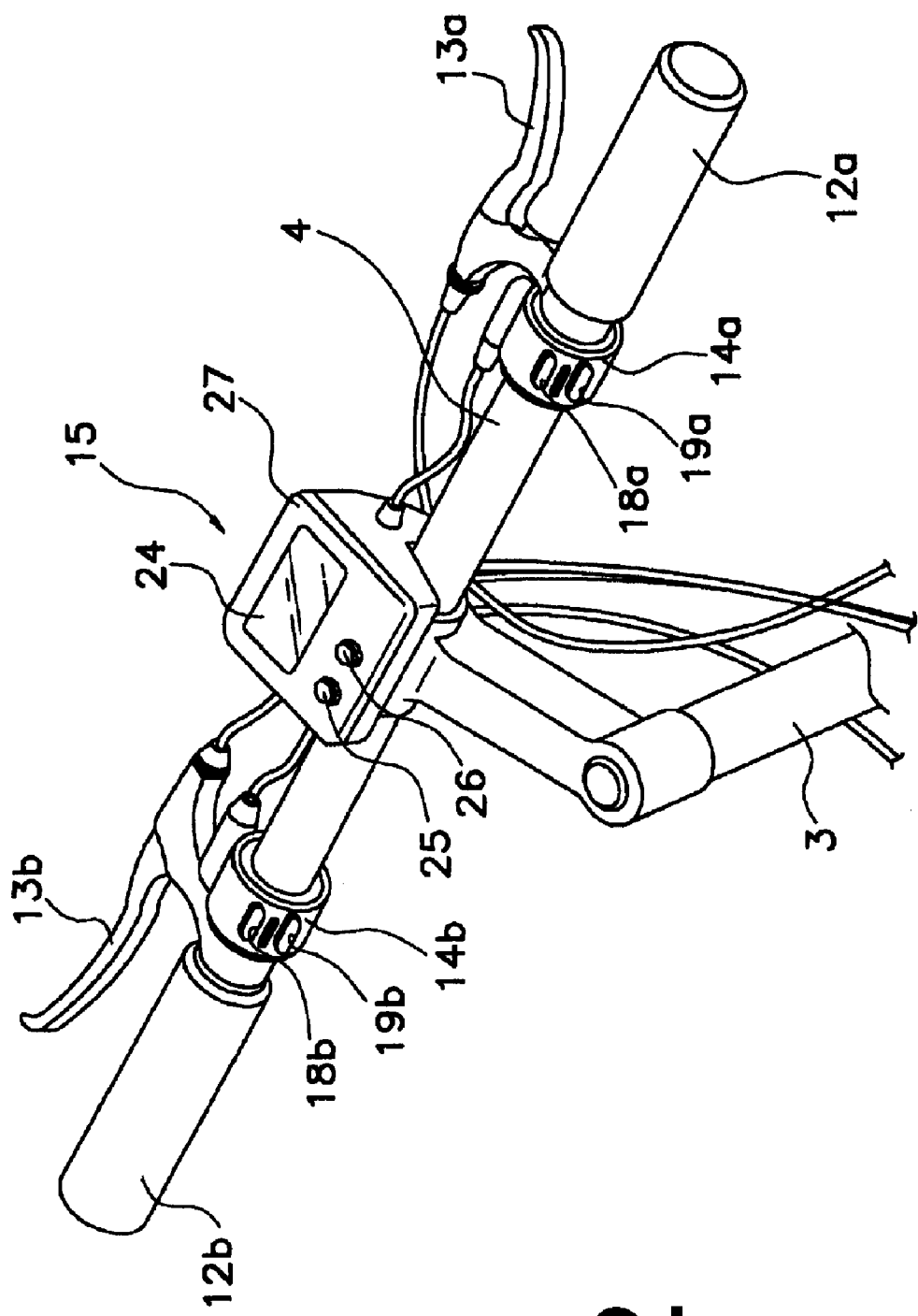
FIG. 2 is a detailed view of particular embodiments of handlebar mounted components.

As shown in FIG. 2, respective grips 12a, 12b and brake levers 13a, 13b are provided on both ends of handlebar assembly 4. Brake lever 13b is connected to front wheel brake 16 for controlling the braking of front wheel 5, and brake lever 13a is connected to rear wheel brake 17 for controlling the braking rear wheel 6. Shift command units 14a, 14b are provided inwardly of grips 12a, 12b and brake levers 13a, 13b, respectively. Transmission control unit 15 is attached to the central portion of handlebar assembly 4, and it is connected to shift command units 14a, 14b. Shift command units 14a, 14b are used for manually shifting front transmission 8 and rear transmission 9. A rear upshift button 18a and a rear downshift button 19a are provided in shift command unit 14a, and a front upshift button 18b and a front downshift button 19b are provided in shift command unit 14b. In this embodiment, upshift buttons 18a and 18b provide signals for upshifting front and rear transmissions 8 and 9 by one gear. Similarly, downshift buttons 19a and 19b provide signals for downshifting front and rear transmissions 8 and 9 by one speed step.

Figure 3:
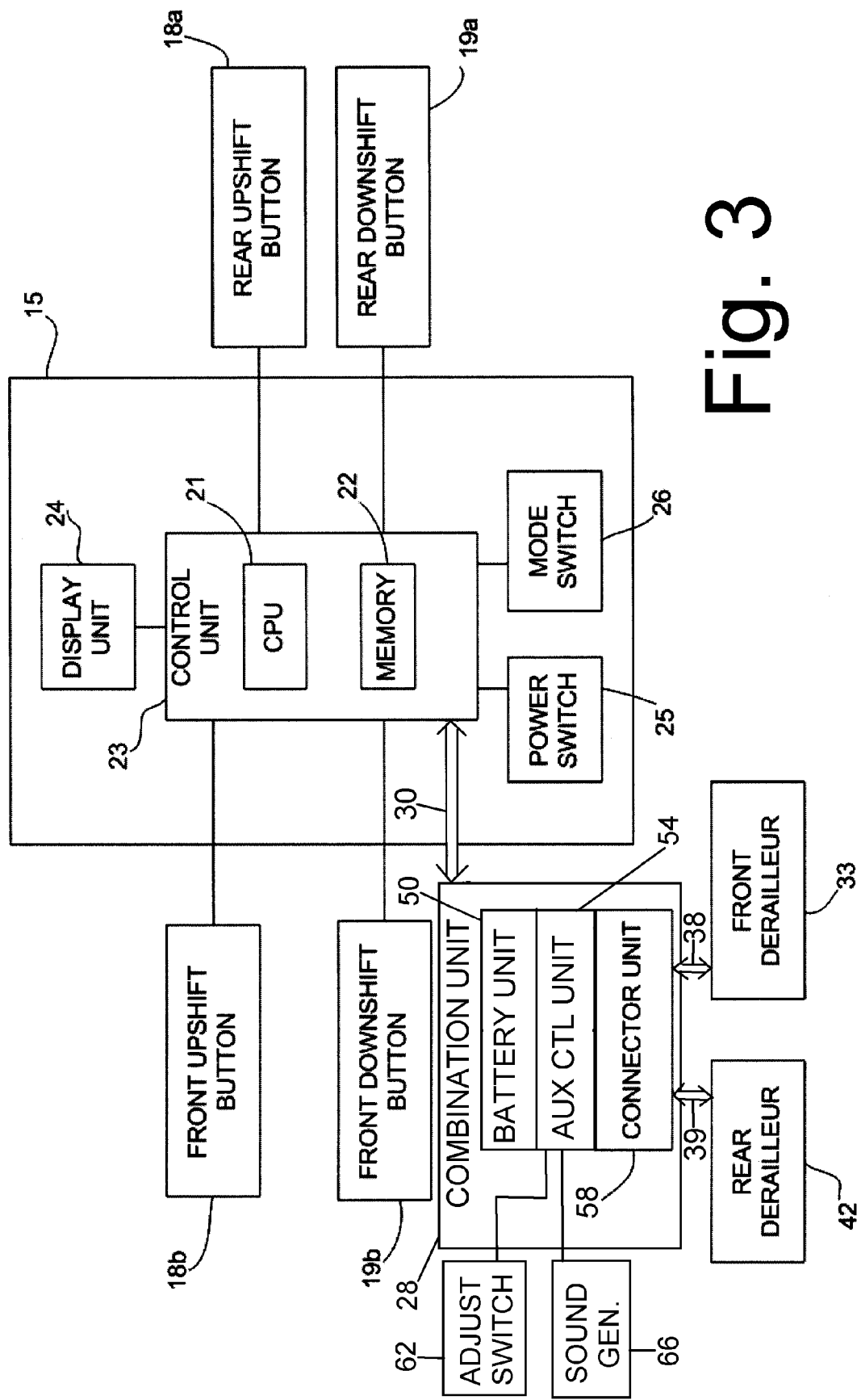
FIG. 3 is a block diagram of a particular embodiment of a control system.

In this embodiment, transmission control unit 15 controls front transmission 8 and rear transmission 9 according to signals provided by shift command units 14a and 14b. Of course, in other embodiments transmission control unit 15 may automatically control front transmission 8 and rear transmission 9 according to wheel speed or crank RPM in many ways known in the art. As shown in FIG. 3, transmission control unit 15, comprises a control unit 23 having a CPU 21 and a memory 22, a display unit 24 for displaying the current transmission gears and other desired information, a power switch 25, and a mode switch 26. CPU 21 is a programmed device that operates on data stored in memory 22 and the signals received from the other attached devices. Mode switch 26 changes an operating mode of transmission control unit 15. Transmission control unit 15 is electrically connected to combination unit 28 through a communication path 30 in the form of a plurality of signal lines. As shown in FIG. 2, transmission control unit 15 includes a housing 27, wherein display unit 24, power switch 25, and mode switch 26 are arranged on the upper surface of housing 27.

Combination unit 28 is electrically connected to the electrical components for front derailleur 33 and rear derailleur 42 through communication paths 38 and 39, respectively, wherein each communication path 38 and 39 comprises a plurality of signal lines. Combination unit 28 comprises a battery unit 50, an auxiliary control unit 54 in the form of a CPU and other electronic circuitry, and a connector unit 58. An adjustment switch 62 and a sound generator 66 are connected to auxiliary control unit 54 for reasons discussed below.

Figure 4:
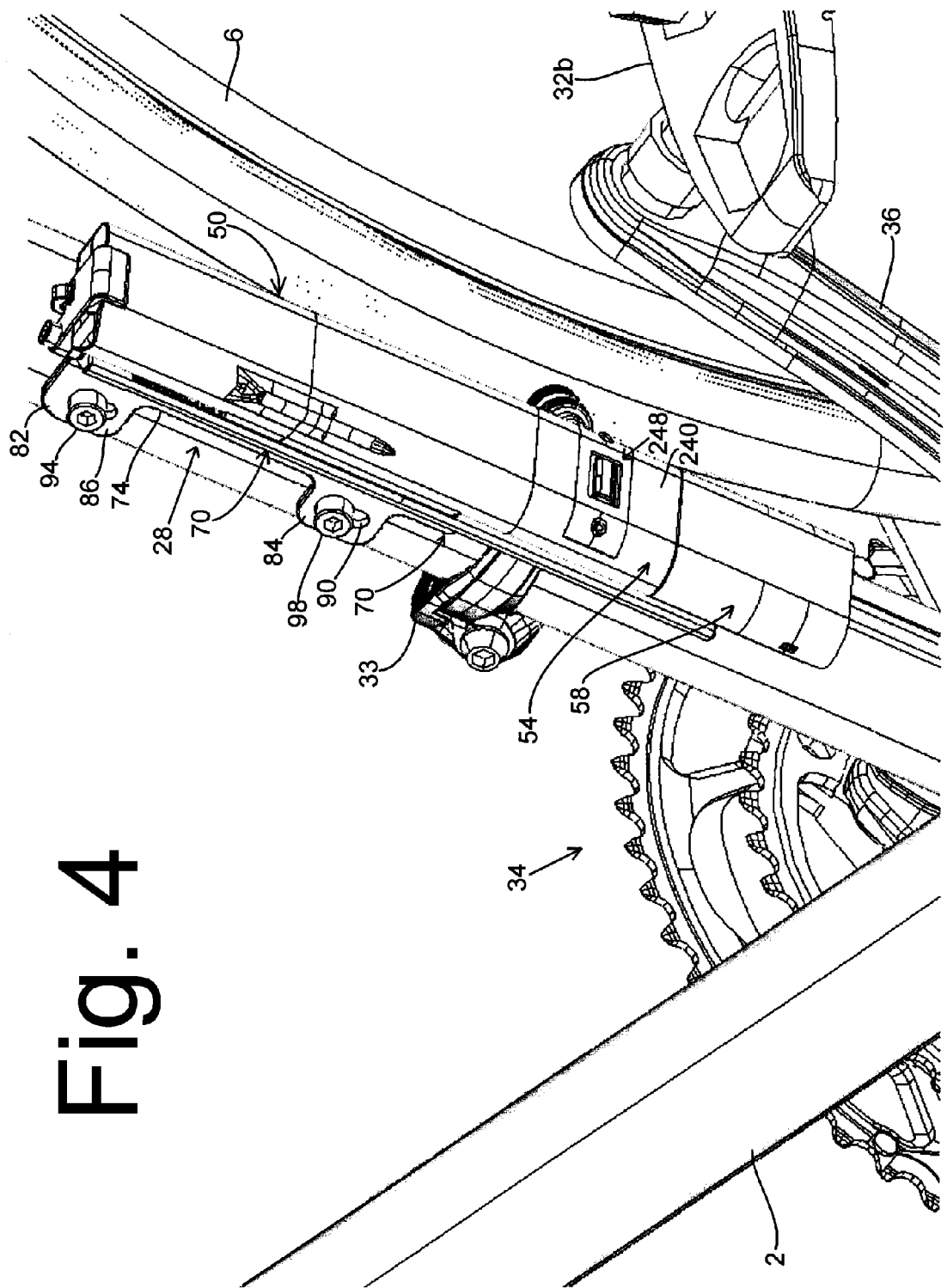
FIG. 4 is a more detailed view of a combination unit shown in FIG. 1.

As shown in FIG. 4, combination unit 28 is physically mounted to a mounting unit 70, wherein battery unit 50 is mounted to the upper portion of mounting unit 70, auxiliary control unit 54 is mounted below battery unit 50, and connector unit 58 is mounted below auxiliary control unit 54. In this embodiment, auxiliary control unit 54 is mounted directly adjacent to battery unit 50, and connector unit 58 is mounted directly adjacent to auxiliary control unit 54.

Figure 5:
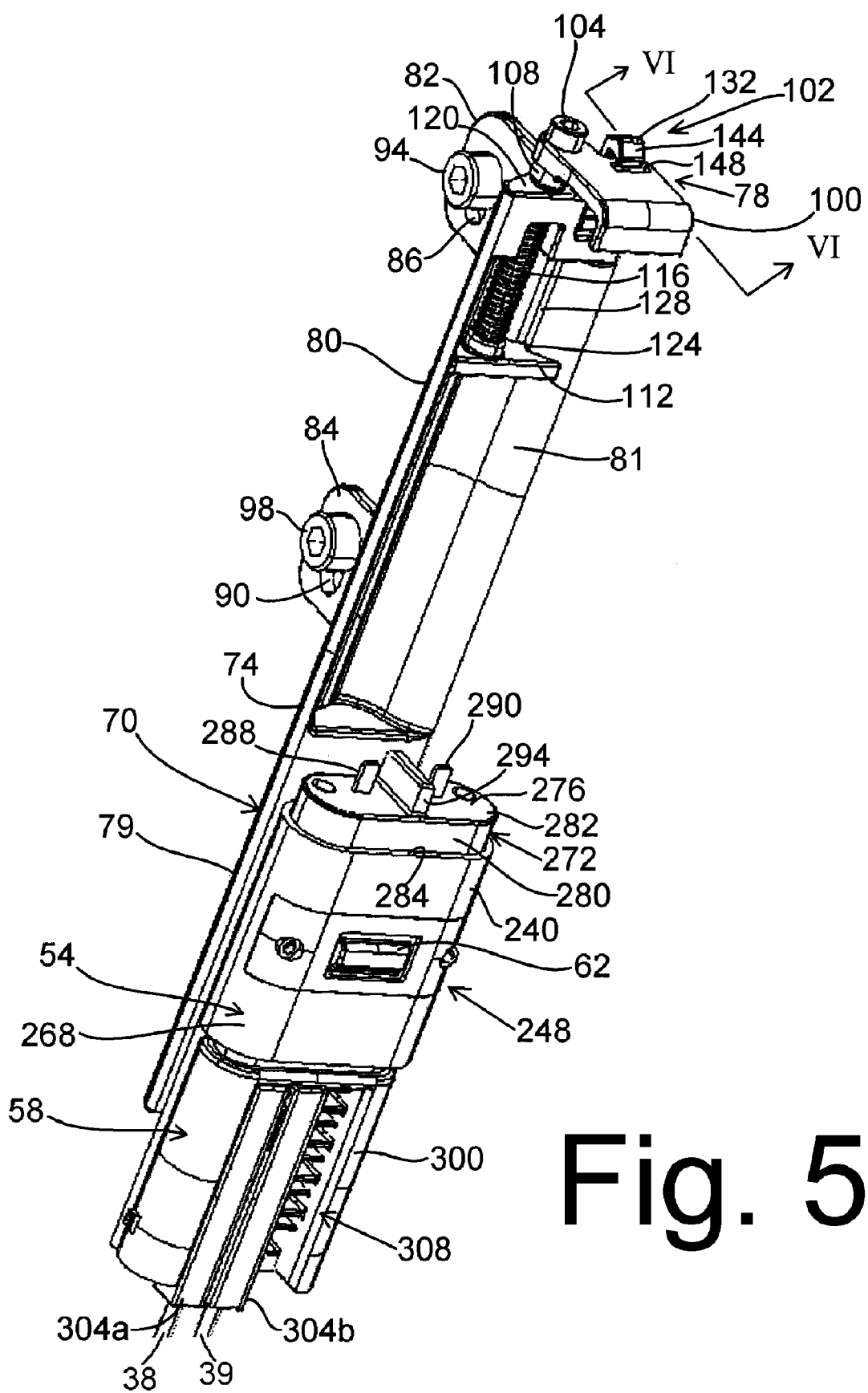
FIG. 5 is a view of the combination unit with the battery unit removed.

FIG. 5 is a view of combination unit 28 with battery unit 50 removed to better show the structure of mounting unit 70. Mounting unit 70 comprises a mounting bracket 74 and a stopper assembly 78. Mounting bracket 74 comprises a substantially flat section 79, a rearwardly curved section 80 forming a vertically elongated recess 81, and a pair of mounting flanges 82 and 84. Mounting flanges 82 and 84 include respective mounting openings 86 and 90 for receiving mounting bolts 94 and 98 therethrough so that mounting unit 70 may be attached to frame body 2 generally vertically as shown in FIG. 4.

Stopper assembly 78 is used to retain battery unit 50 to mounting bracket 74, and it comprises a stopper member 100, a locking assembly 102, a guide bolt 104 attached to stopper member 100 through a lock nut 108, a guide plate 112 attached to the bottom of guide bolt 104, and a stopper member spring 116 encircling guide bolt 104 and disposed between guide plate 112 and a top wall 120 of curved section 80 of mounting bracket 74. Guide plate 112 includes a pair of opposed guide projections 124 (only one such projection 124 is shown in FIG. 5) that slidingly engage a corresponding pair of guide grooves 128 (only one such groove is shown in FIG. 5). As a result of this structure, stopper member 100 is biased downwardly.

Figure 6:
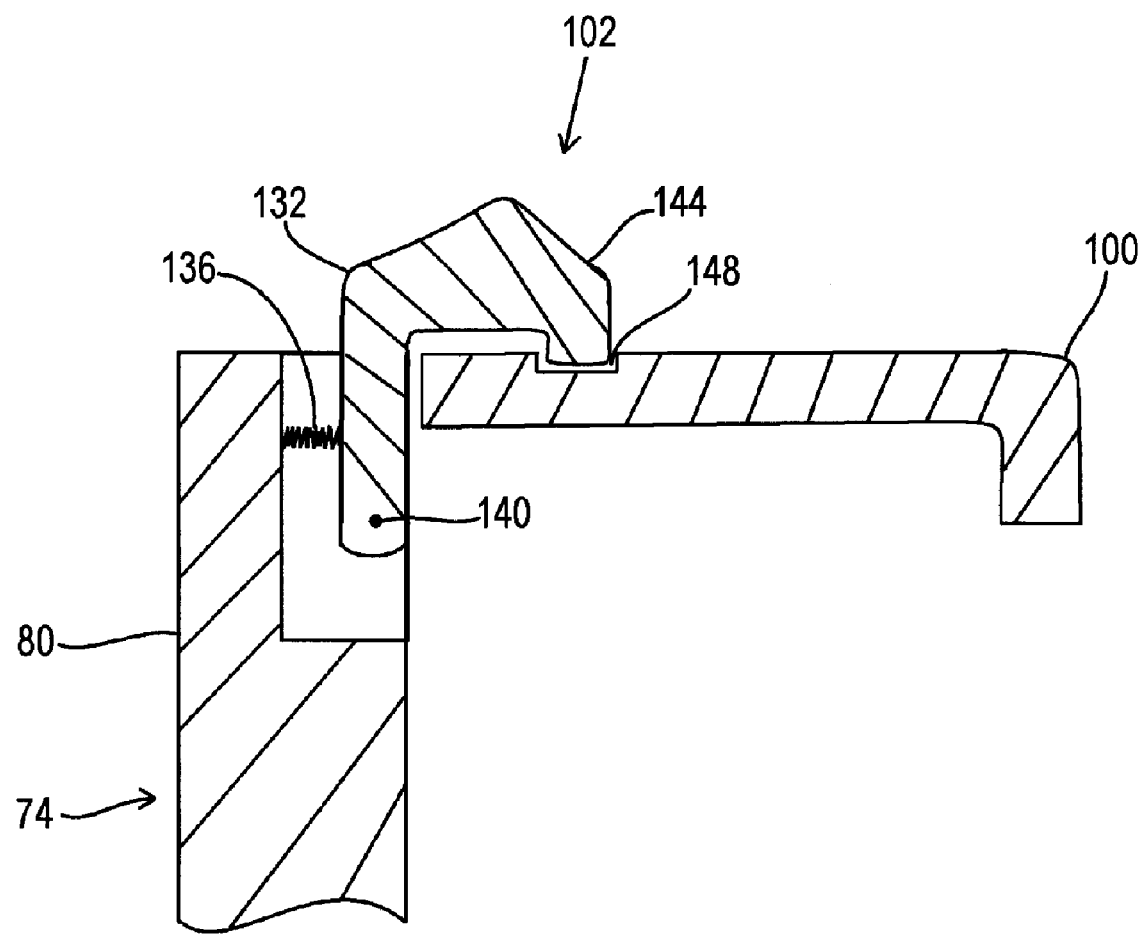
FIG. 6 is a view taken along line VI-VI in FIG. 5.

As shown in FIGS. 5 and 6, locking assembly 102 comprises a locking member 132 and a locking member spring 136. Locking member 132 has the form of a substantially inverted L-shaped locking pawl pivotably mounted to curved section 80 of mounting bracket 74 through a pivot shaft 140. A pawl tooth 144 of locking member 132 engages a recess 148 in stopper member 100 to prevent stopper member 100 from moving upwardly. Locking member spring 136 biases locking member 132 clockwise toward engagement with stopper member 100. However, locking member 132 may be rotated counterclockwise simply by using a finger or thumb to disengage locking member 132 from stopper member 100 so that stopper member 100 may be moved upwardly.

Figure 7:
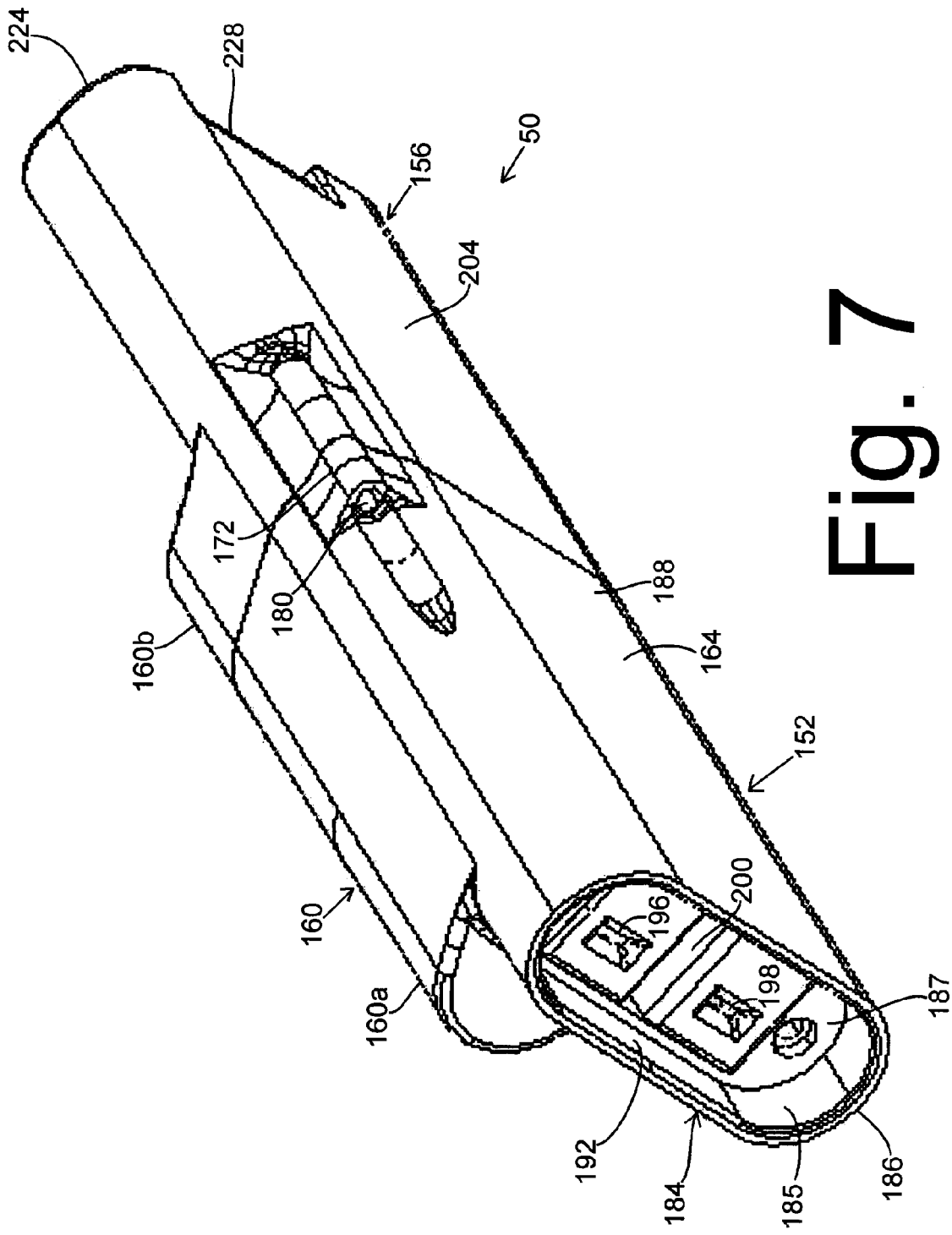
FIG. 7 is a bottom oblique view of the battery unit.
Figure 8:
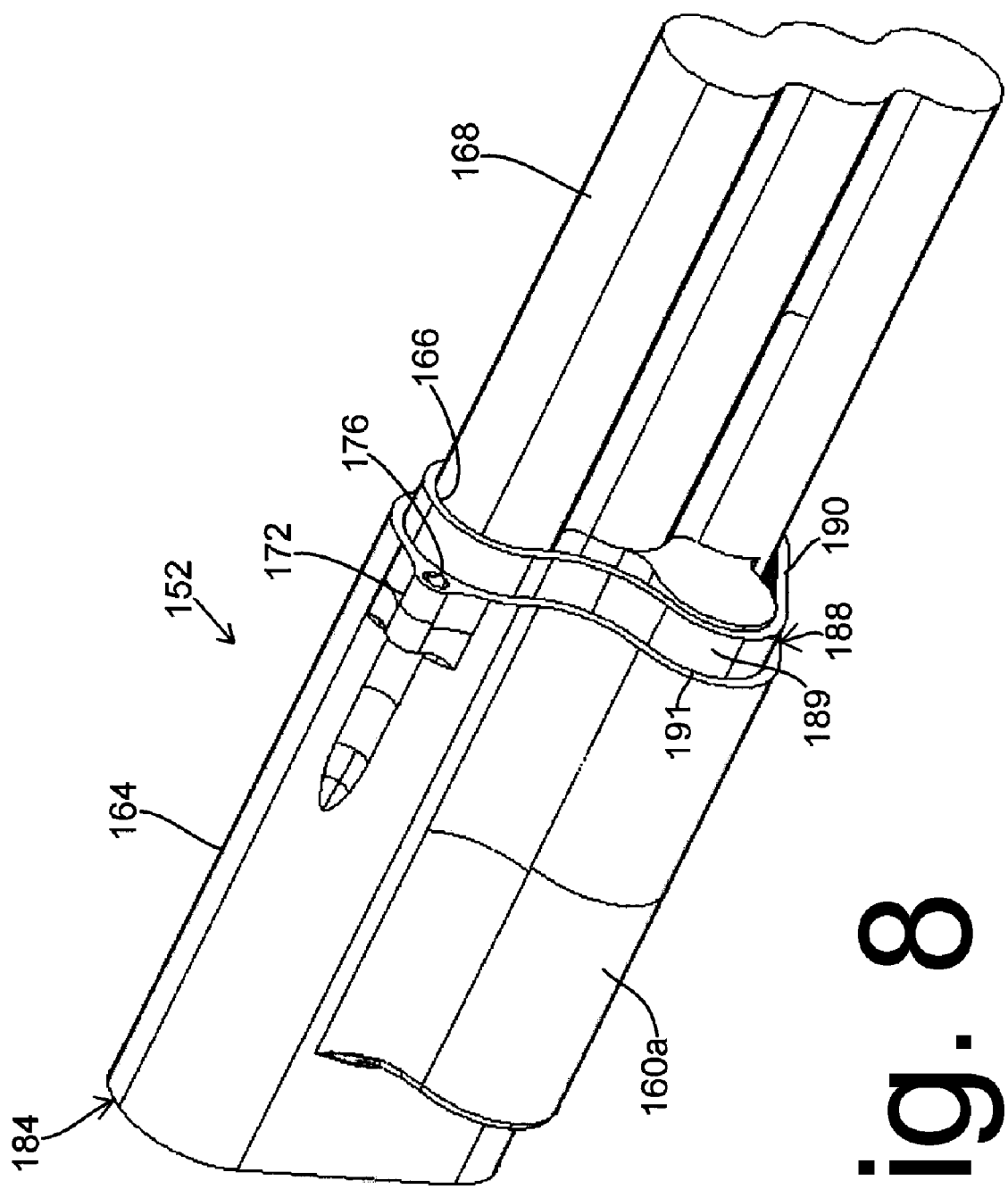
FIG. 8 is a side oblique view of the main compartment of the battery unit.
Figure 9:
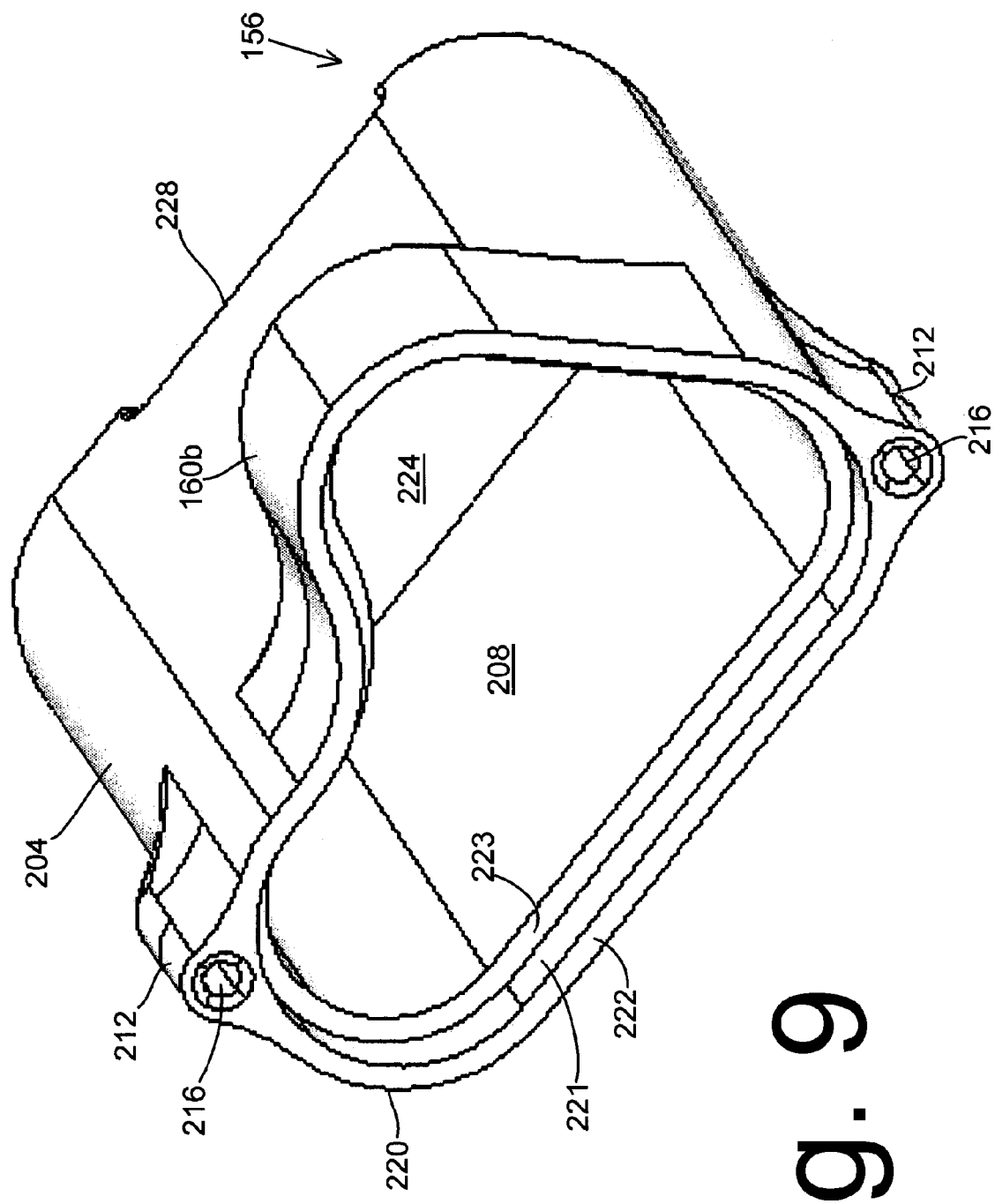
FIG. 9 is a bottom oblique view of the top cover for the battery unit.

FIG. 7 is a bottom oblique view of battery unit 50, FIG. 8 is a side oblique view of a main compartment 152 of battery unit 50, and FIG. 9 is a bottom oblique view of a top cover 156 for battery unit 50. Battery unit 50 generally has a shape of an elongated ellipsoid with an elongated arcuate fitting projection 160 that fits into recess 81 of mounting bracket 74 when battery unit 50 is mounted to mounting unit 70. As shown in FIGS. 7 and 8, main compartment 152 comprises an elongated oval case member 164 with an opening 166 that partially houses a removable battery 168, a portion 160a of fitting projection 160 extending from the rear of case member 164, a pair of mounting ears 172 with corresponding mounting openings 176 for receiving mounting screws 180 therethrough, an oval overlapping wall 184, and an oval overlapped wall 188. In this embodiment, overlapping wall 184 is a continuous oval wall that forms an interior space 192 for housing a pair of battery terminals 196 and 198 and a partition groove 200. Overlapping wall 184 includes an inner peripheral surface 185 and an outer end surface 186, wherein inner peripheral surface 185 extends from an inner end surface 187. Overlapped wall 188 is a continuous but irregularly shaped wall (since it forms a part of fitting projection 160a) that is recessed inwardly from the outer surface of case member 164. Overlapped wall 188 includes an outer peripheral surface 189 and an end surface 190, wherein outer peripheral surface 189 extends from an inner end surface 191.

As shown in FIGS. 7 and 9, top cover 156 comprises an elongated oval case member 204 with an opening 208 that houses the remaining portion of battery 168, a portion 160b of fitting projection 160 extending from the rear of case member 204, a pair of mounting ears 212 with corresponding threaded mounting openings 216 for threadingly receiving mounting screws 180 therein, a continuous irregularly shaped overlapping wall 220, and an oval-shaped top wall 224. Top wall 224 includes a recess 228 that engages stopper member 100 of stopper assembly 78 when battery unit 50 is mounted to mounting bracket 74. Overlapping wall 220 includes an inner peripheral surface 221 and an outer end surface 222, wherein inner peripheral surface 221 extends from an inner end surface 223. Overlapping wall 220 fits over overlapped wall 188 in case member 164 when top cover 156 is mounted to main compartment 152 so that inner peripheral surface 221 of overlapping wall 220 faces outer peripheral surface 189 of overlapped wall 188, outer end surface 222 of overlapping wall 220 faces downwardly toward inner end surface 191 of case member 164 when battery unit 50 is mounted to mounting bracket 74 and mounting bracket 74 is mounted to frame 2, and inner end surface 223 of case member 204 faces outer end surface 190 of overlapped wall 188. This overlapping configuration provides an upwardly convoluted path for any water that may attempt to enter openings 166 and 208 in case members 164 and 204, respectively, when riding in wet conditions.

Figure 10:
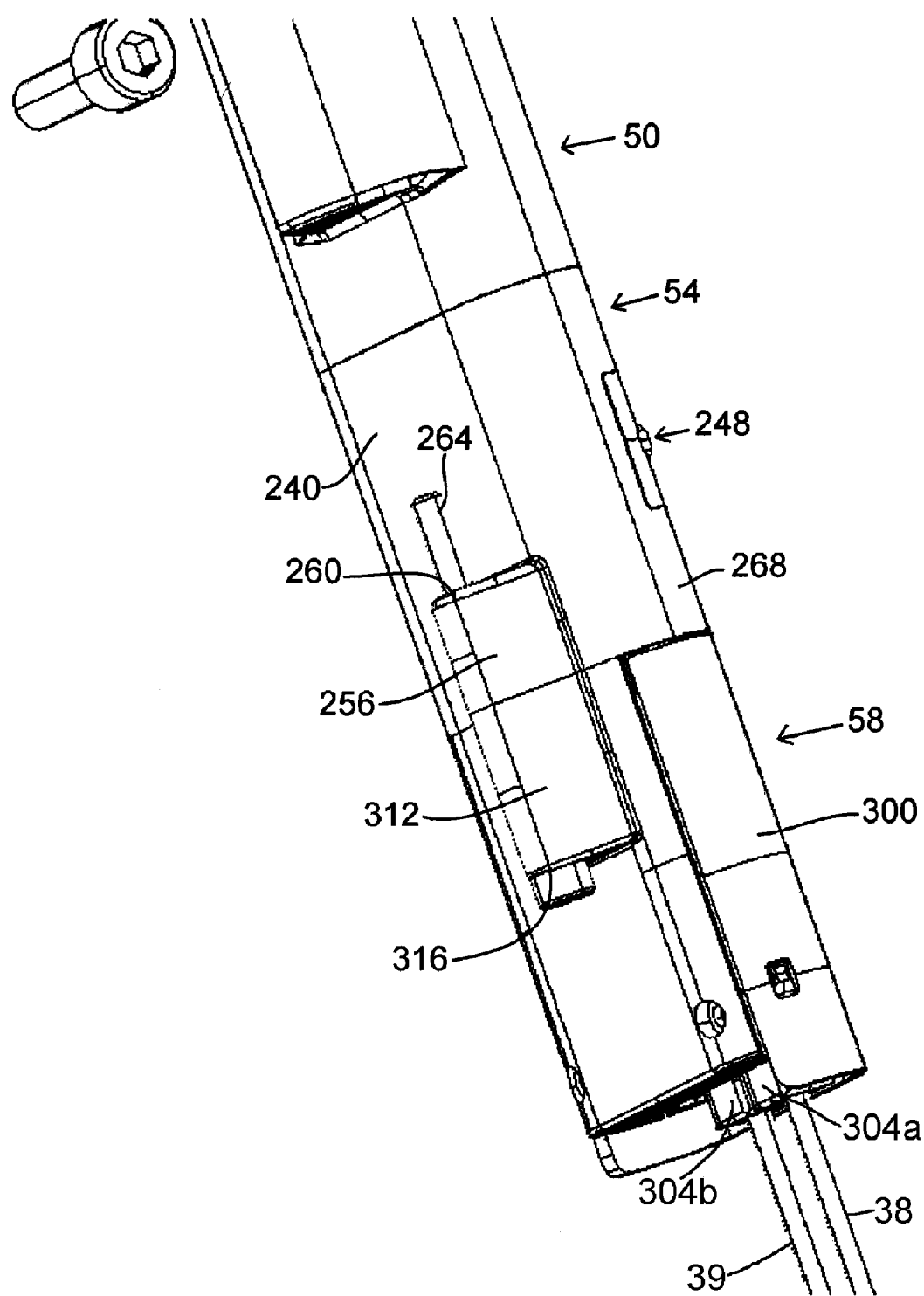
FIG. 10 is a rear oblique view of the combination unit.
Figure 11:
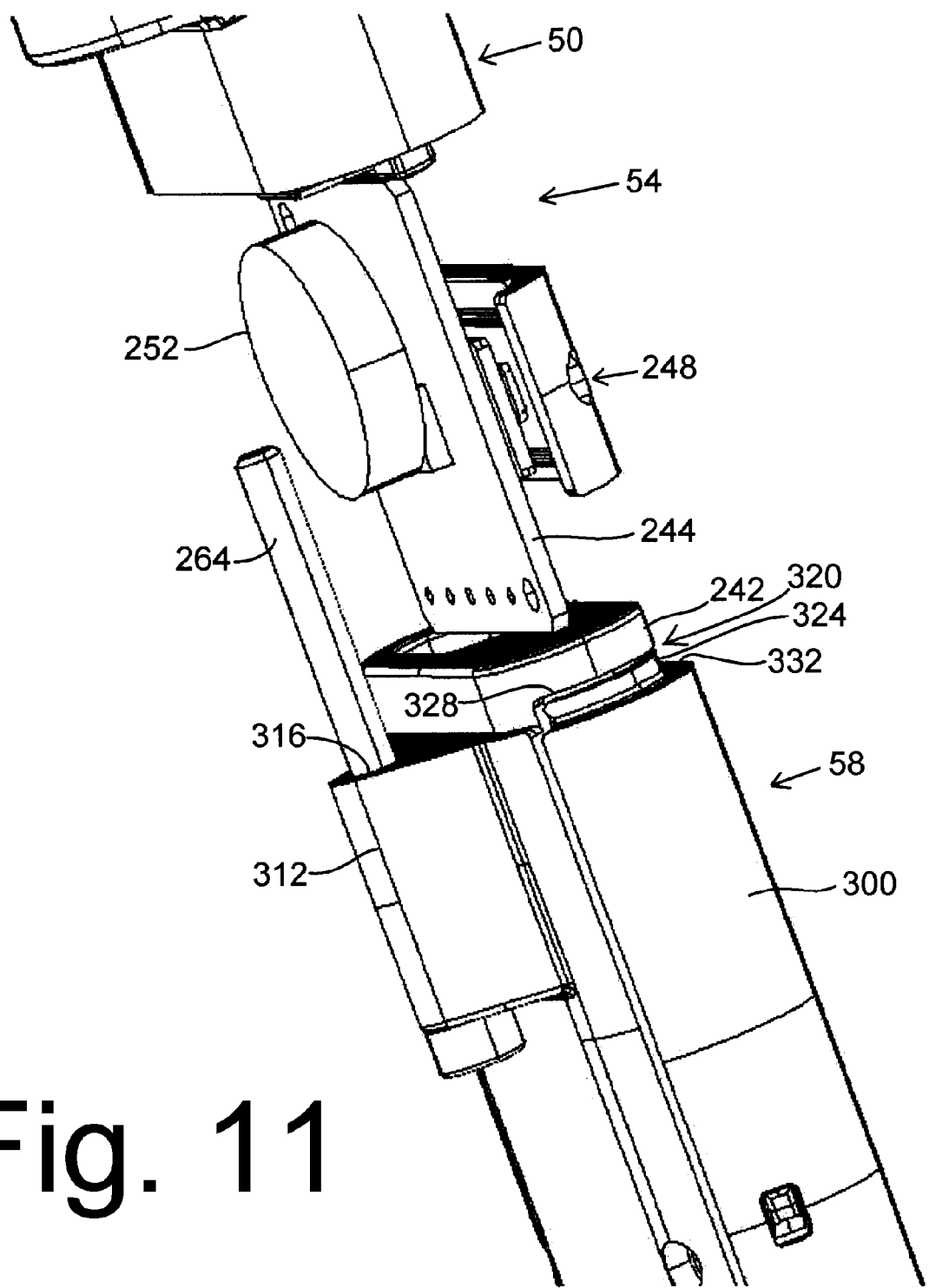
FIG. 11 is a rear oblique view of the combination unit with the control unit cover removed.

As shown in FIGS. 5, 10 and 11, auxiliary control unit 54 physically comprises a case member 240, a mounting pedestal 242 (FIG. 11), a base member 244, an input unit 248 and a sound generating unit 252. Case member 240 includes a mounting ear 256 (FIG. 10) with a corresponding mounting opening 260 for receiving a mounting screw 264 therethrough, an oval overlapping wall 268, and an oval overlapped wall 272 (FIG. 5) with a top surface 276. In this embodiment, overlapping wall 268 has generally the same waterproofing structure as overlapping wall 184 in main compartment 152 of battery unit 50 and will not be described further. Overlapped wall 272 is a continuous oval-shaped wall that is recessed inwardly from the outer surface of case member 240. Overlapped wall 272 includes an outer peripheral surface 280 and an outer end surface 282 that forms a part of top surface 276, wherein outer peripheral surface 280 extends from an inner end surface 284. Thus, when battery unit 50 is mounted to auxiliary control unit 54 such that overlapping wall 184 of main compartment 152 of battery unit 50 fits over overlapped wall 272 in case member 240 of auxiliary control unit 54, inner peripheral surface 185 of overlapping wall 184 faces outer peripheral surface 280 of overlapped wall 272, outer end surface 186 of overlapping wall 184 faces downwardly toward inner end surface 284 of case member 240, and inner end surface 187 of case member 164 faces outer end surface 282 of overlapped wall 272. This overlapping configuration also provides an upwardly convoluted path for any water that may attempt to enter interior space 192 in battery unit 50 when riding in wet conditions.

As shown in FIG. 11, base member 244 is mounted edgewise to mounting pedestal 242 and supports both input unit 248 and sound generating unit 252, as well as the processor and/or other electronics used to control whatever functions are performed by auxiliary control unit 54. Base member 244 may comprises a printed circuit board with the appropriate electronic components and conductive traces to service input unit 248 and sound generating unit 252. Power terminals 288 and 290 (FIG. 5) in the form of spade terminals extend from the upper edge of base member 244 and through top surface 276 in overlapped wall 272 so that power terminals 288 and 290 may engage battery terminals 196 and 198 when battery unit 50 is mounted on top of auxiliary control unit 54. A partition projection 294 is formed on top surface 276 to engage partition groove 200 in battery unit 50 when battery unit 50 is mounted on top of auxiliary control unit 54 to further isolate battery terminal 196 and power terminal 288 from battery terminal 198 and power terminal 290 and reduce the risk that dampness can short circuit the terminals or otherwise affect the transfer of power between battery unit 50 and auxiliary control unit 54.

Input unit 248 may be used to set modes and/or input any parameters desired for the particular function using an appropriate input mechanism. In this embodiment, input unit 248 is used to enter and exit an adjustment processing mode for fine tuning the positions of rear derailleur 42. For that purpose, adjustment switch 62 is provided, wherein the adjustment processing mode may be entered and exited by pressing adjustment switch 62 for a predetermined time period (e.g., two seconds) or longer. Sound generating unit 252 may comprise a buzzer or the like for alerting the user that the desired mode has been entered, for indicating successful adjustment of rear derailleur 42, or for some other informational purpose. By locating input unit 248 on the lower middle portion of frame 2 away from transmission control unit 15 on handlebar assembly 4, there is less chance that the rider may inadvertently trigger the adjustment processing mode.

Figure 13:
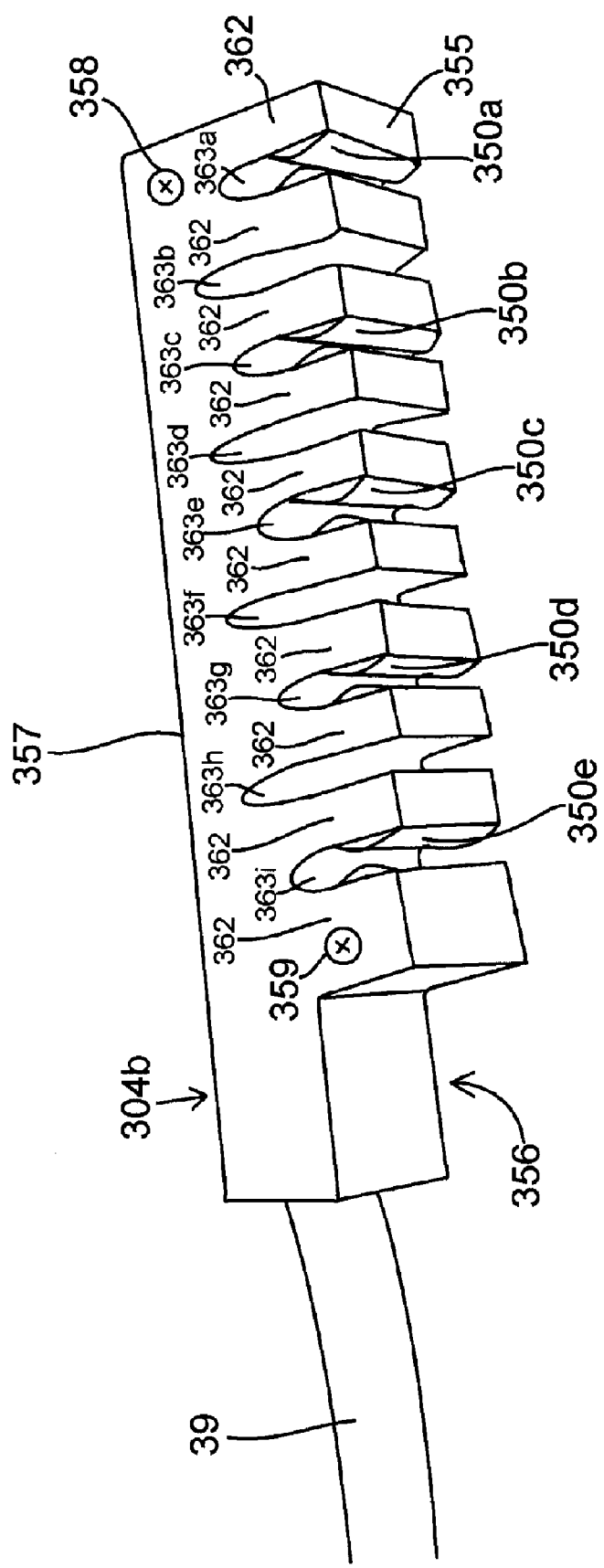
FIG. 13 is a side view of a terminal plug.

As shown in FIG. 5, connector unit 58 comprises a case member 300 and a plurality of electrical contacts 308 housed by case member 300. Terminal plugs 304a and 304b that terminate communication paths 38 and 39, respectively, are shown plugged into connector unit 58. Another terminal plug (not shown) is used to terminate communication path 30, and it is plugged into the exposed area shown in FIG. 5. A more detailed view of terminal plug 304b disconnected from connector unit 58 is shown in FIG. 13. The other terminal plugs have the same construction (except, of course, for the signal lines being terminated). The structure of terminal plug 304b is discussed below.

As shown in FIG. 11, case member 300 includes a mounting ear 312 with a corresponding mounting opening 316 for receiving mounting screw 264 therethrough, and a partial oval-shaped overlapped wall 320. While overlapped wall 320 is a partial wall, it cradles mounting pedestal 242 of auxiliary control unit 54 to function in a manner similar to the overlapped walls described for the other components when case member 240 of auxiliary control unit 54 is in place. Overlapped wall 320 includes an outer peripheral surface 324 and an outer end surface 328, wherein outer peripheral surface 324 extends from an inner end surface 332. Thus, when connector unit 58 is mounted to auxiliary control unit 54, overlapping wall 268 of case member 240 engages overlapped wall 324 and mounting pedestal 242 to form a waterproof structure in the same manner noted above.

Figure 12:
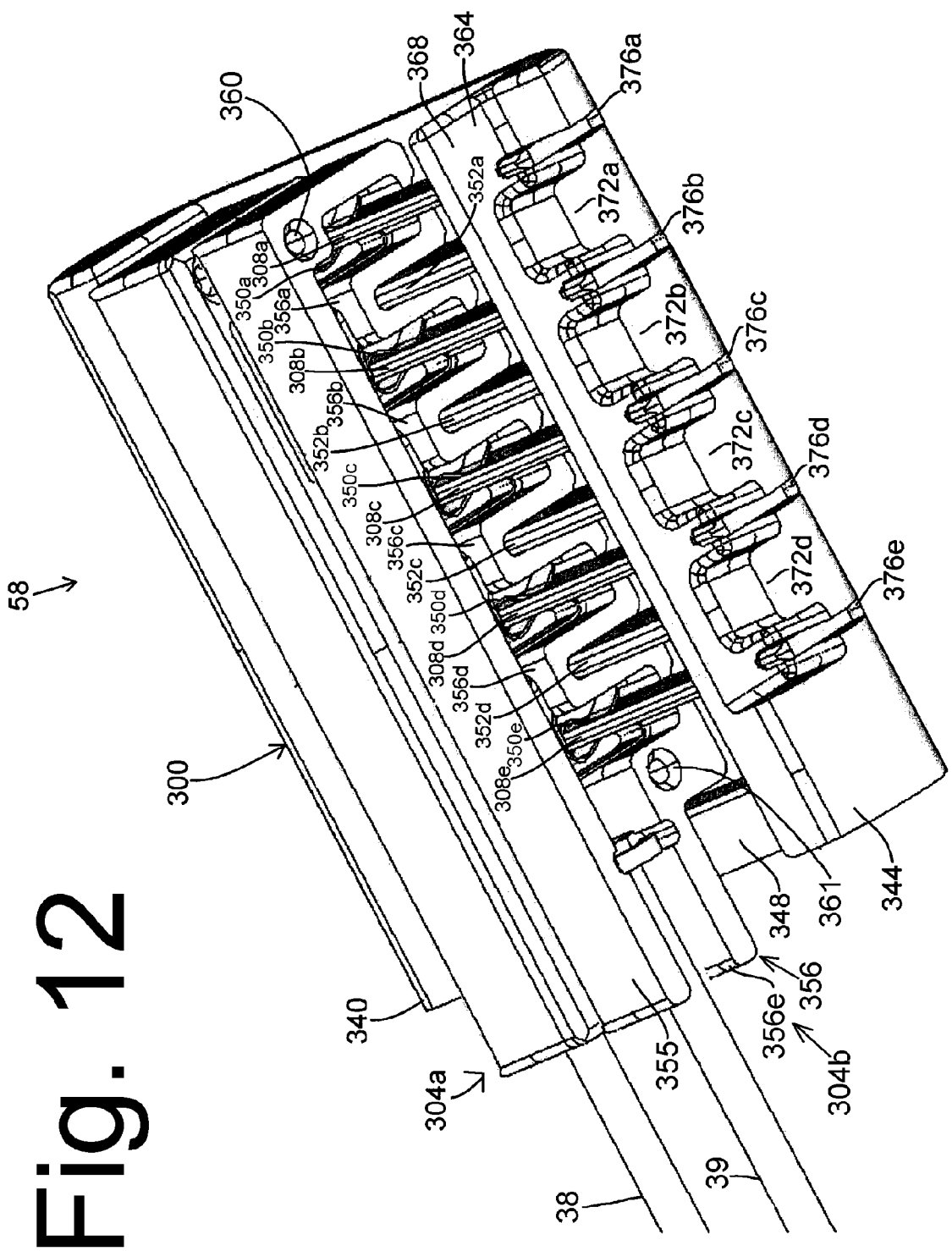
FIG. 12 is a more detailed view of the connector unit.

FIG. 12 is a more detailed view of connector unit 58 with the attached terminal plugs 304a and 304b. Also, the side cover of terminal plug 304b has been removed to expose the components therein. In general, connector unit 58 is structured so that a particular signal line or terminal plug can be attached at multiple locations. More specifically, case member 300 includes side walls 340 and 344 and a bottom wall 348. Each of a plurality of terminals or contact bars 308a-308e extends from side wall 340 to side wall 344, and insulation walls 352a-352d are disposed between adjacent ones of the plurality of contact bars 308a-308e to electrically isolate the plurality of contact bars 308a-308e from each other. In this embodiment, contact bar 308a is structured to carry the positive signal from battery unit 50, contact bar 308b is structured to carry signals to activate rear derailleur 42, contact bar 308c is structured to carry signals to activate front derailleur 33, contact bar 308d is structured to carry gear position signals from front derailleur 33 and rear derailleur 42 as well as the signals from adjustment switch 62, and contact bar 308e is structured to carry the negative or ground signal form battery unit 50. Each contact bar 308a-308e can be considered a terminal row, and the area covered by each terminal plug 304a and 304b (as well as the exposed area shown in FIGS. 5 and 12) can be considered a terminal column. Thus, the portion of a particular contact bar 308a-308e beneath a corresponding terminal plug 304a or 304b (or exposed area) can be considered a cell of a 5 by 3 matrix, wherein the plurality of electrical contacts 308 horizontally spaced apart in a terminal row formed by one of contact bars 308a-308e electrically combine signals applied thereto. On the other hand, the signals applied to the plurality of electrical contacts 308 in a terminal column are not electrically combined.

FIGS. 12 and 13 illustrate the structure of terminal plug 304b. In this embodiment, terminal plug 304b has a comb shape, and it comprises an L-shaped top wall 355, an undulating discontinuous bottom wall 356 comprising a plurality of segments 356a-356e, and a pair of comb-shaped side covers 357 (only one side cover 357 is shown in FIG. 13, and none are shown in FIG. 12). Side covers 357 are fastened to top wall 355 and bottom wall 356 by screws 358 and 359 that extend into threaded openings 360 and 361 in top wall 355 and bottom wall 356, respectively. The resulting structure produces a plurality of teeth 362 separated by U-shaped recesses 363a-363i. Recesses 363b, 363d, 363f and 363h are basically empty and shaped to receive respective insulation bars 352a-352d therein when terminal plug 304b is plugged into connector unit 58. On the other hand, each recess 363a, 363c, 363e, 363g and 363i may be used to electrically couple a signal line to respective ones of the plurality of contact bars 308a-308e. In this embodiment, each recess 363a, 363c, 363e, 363g and 363i respectively contains a generally W-shaped conductive latch in the form of a metal spring contact 350a-350e. Each spring contact 350a-350e has a generally Q-shaped middle section structured to contact a respective contact bar 308a-308e in a pinching manner to thereby electrically couple one of the signal lines to its corresponding contact bar 308a-308e. If a particular signal line is unused, then a spring contact may be omitted from its associated recess 363a, 363c, 363e, 363g or 363i.

Finally, an undulating insulation bar 364 (shown on its side in a removed and flipped condition) may be provided to function as a blank terminal plug for each unused contact column to further protect and insulate the components therein. Insulation bar 364 comprises an insulation bar body 368 defining a plurality of insulation wall recesses 372a-372d, one for each insulation wall 352a-352d, and a plurality of contact covers 376a-376e, one for each corresponding segment of a contact bar 308a-308e.

It should be readily apparent that connector unit 58 may function as a junction or distribution box. With the contact bar assignments noted above, it is possible to have the terminal plug structure for communication paths 30, 38 and 39 shown in Table 1.

TABLE 1

| Communication Path | Contact/Signal Line | Direction |
|---|---|---|
| 30 | 350a/Power. | Battery unit 50 to transmission control unit 15. |
|  | 350b/Shift signal for rear derailleur. | Transmission control unit 15 to combination unit 28. |
|  | 350c/Shift signal for front derailleur. | Transmission control unit 15 to combination unit 28. |
|  | 350d/Gear position signal. | Combination unit 28 to transmission control unit 15. |
|  | 350e/Ground. | Common. |
| 38 | 350a/Power. | Battery unit 50 to front derailleur 33. |
|  | 350b/Unused. | Unused. |
|  | 350c/Shift signal for front derailleur. | Combination unit 28 to front derailleur 33. |
|  | 350d/Gear position signal. | Front derailleur 33 to combination unit 28. |
|  | 350e/Ground. | Common. |
| 39 | 350a/Power. | Battery unit 50 to rear derailleur 42. |
|  | 350b/Shift signal for rear derailleur. | Combination unit 28 to rear derailleur 42. |
|  | 350c/Unused. | Unused. |
|  | 350d/Gear position signal. | Rear derailleur 42 to combination unit 28. |
|  | 350e/Ground. | Common. |

The above structures allow the terminal plugs for any one of the communication paths 30, 38 or 39 to be connected to any column of contacts. The user need not be concerned with any particular columnar position of the terminal plug. The same terminal plug may be used for any device. All that needs to be done is to connect the signal lines into the appropriate spring contacts 350a-350e in the terminal plug. The waterproofing structures noted above provide a simple method of protecting the electrical components without requiring a separate seal. The mounting structures for battery unit 50 allow battery unit 50 to be secured to the bicycle while allowing simple removal. Also, the combination of battery unit 50 with auxiliary control unit 54 and connector unit 58 provide a very compact structure with reduced wiring. The provision of auxiliary control unit 54 also allows some functions to be conveniently accessed by the rider without inadvertent operation of the unit.

While the above is a description of various embodiments of inventive features, further modifications may be employed without departing from the spirit and scope of the present invention. For example, not all of the plurality of electrical contacts in a row described above need to be combined, and not all of the plurality of electrical contacts in a column need to be mutually exclusive. While inventive features were described with respect to a mountain bicycle, the concepts taught herein may be applied to road racers or any other type of bicycle, and to any kind of electrical component. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An apparatus for mounting a battery to a mounting member comprising:
   a battery case member structured to be mounted to the mounting member such that the battery case member is removed from the mounting member by moving the battery case member in a first direction, wherein the battery case member has a surface facing in the first direction; and
   a stopper member structured to engage the surface of the battery case member to inhibit movement of the battery case member in the first direction;
   wherein the stopper member is biased in a second direction opposite the first direction by a spring; and,
   wherein the stopper member is mounted to a mounting bracket such that the stopper member moves in the first direction.

2. The apparatus according to claim 1 further comprising a locking member that prevents the stopper member from moving in the first direction.

3. An apparatus for mounting a battery to a bicycle comprising:
   a mounting bracket;
   a battery case member structured to be mounted in close proximity to the mounting bracket such that the battery case member is removed by moving the battery case member in a first direction, wherein the battery case member has a surface facing in the first direction; and
   a stopper member coupled to the mounting bracket and structured to engage the surface of the battery case member to inhibit movement of the battery case member in the first direction;
   wherein the stopper member is biased in a second direction opposite the first direction by a spring.

4. The apparatus according to claim 3 wherein the stopper member is mounted to the mounting bracket such that the stopper member moves in the first direction.

5. The apparatus according to claim 4 further comprising a locking member that prevents the stopper member from moving in the first direction.

6. The apparatus according to claim 5 further comprising a mounting member coupled to the mounting bracket, wherein the battery case is structured to be mounted to the mounting member.

7. The apparatus according to claim 6 wherein the mounting member includes a first electrical terminal structured to engage a first battery terminal supported by the battery case.

8. The apparatus according to claim 7 wherein the mounting member includes a second electrical terminal structured to engage a second battery terminal supported by the battery case.

9. The apparatus according to claim 5 wherein the locking member coprises a locking pawl.

10. The apparatus according to claim 5 wherein the locking member is coupled to the mounting bracket.

11. The apparatus according to claim 10 wherein the locking member is biased toward engagement with the stopper member.

12. The apparatus according to claim 11 wherein the locking member is biased toward engagement with the stopper member by a spring.

13. The apparatus according to claim 11 wherein the stopper member is biased in the second direction by a stopper member spring, and wherein the locking member is biased toward engagement with the stopper member by a locking member spring.

14. An apparatus for mounting a battery to a bicycle comprising:
   a mounting bracket;
   a battery case member structured to be mounted in close proximity to the mounting bracket such that the battery case member is removed by moving the battery case member in a first direction, wherein the battery case member has a surface facing in the first direction;
   a stopper member coupled to the mounting bracket and structured to engage the surface of the battery case member to inhibit movement of the battery case member in the first direction;
   a locking pawl that prevents the stopper member from moving in the first direction;
   wherein the locking pawl includes a pawi tooth that engages a recess in the stopper member.

15. An apparatus for mounting an electrical component to a bicycle comprising:
   a mounting bracket;
   an electrical component case member structured to be mounted in close proximity to the mounting bracket such that the electrical component case member is removed by moving the electrical component case member in a first direction, wherein the electrical component case member has a surface facing in the first direction; and
   a stopper member coupled to the mounting bracket and structured to engage the surface of the electrical component case member to inhibit movement of the electrical component case member in the first direction;
   wherein the stopper member is biased in a second direction opposite the first direction by a spring.

* * * * *